United States Patent
Wang et al.

(10) Patent No.: US 11,469,409 B2
(45) Date of Patent: Oct. 11, 2022

(54) NEGATIVE ELECTRODE AND BATTERY

(71) Applicant: Contemporary Amperex Technology Co., Limited, Ningde (CN)

(72) Inventors: Jiazheng Wang, Ningde (CN); Yuliang Shen, Ningde (CN); Meng Kang, Ningde (CN); Libing He, Ningde (CN); Baojian Zhu, Ningde (CN); Lei Chen, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 14 days.

(21) Appl. No.: 17/232,142

(22) Filed: Apr. 15, 2021

(65) Prior Publication Data
US 2021/0234148 A1    Jul. 29, 2021

Related U.S. Application Data

(63) Continuation of application No. PCT/CN2019/111333, filed on Oct. 15, 2019.

(30) Foreign Application Priority Data

Oct. 17, 2018  (CN) .......................... 201811208751.7

(51) Int. Cl.

| H01M 4/13 | (2010.01) |
|---|---|
| H01M 4/48 | (2010.01) |
| H01M 4/58 | (2010.01) |
| H01M 10/05 | (2010.01) |
| H01M 4/485 | (2010.01) |
| H01M 4/587 | (2010.01) |
| H01M 10/0525 | (2010.01) |
| H01M 4/02 | (2006.01) |

(52) U.S. Cl.
CPC ............. *H01M 4/13* (2013.01); *H01M 4/485* (2013.01); *H01M 4/587* (2013.01); *H01M 10/0525* (2013.01); *H01M 2004/021* (2013.01); *H01M 2004/027* (2013.01)

(58) Field of Classification Search
None
See application file for complete search history.

(56) References Cited

FOREIGN PATENT DOCUMENTS

| CN | 101499530 A | | 8/2009 | |
|---|---|---|---|---|
| CN | 104577193 A | | 4/2015 | |
| CN | 104617260 A | | 5/2015 | |
| CN | 106159244 A | | 11/2016 | |
| CN | 108461842 A | * | 8/2018 | ............ H01M 10/42 |
| CN | 108461842 A | † | 8/2018 | |
| CN | 109461880 A | | 3/2019 | |
| CN | 109461880 B | † | 3/2019 | |

OTHER PUBLICATIONS

The Second Office Action for Chinese Application No. 201811208751.7, dated Apr. 16, 2020, 8 pages.
PCT International Search Report for PCT/CN2019/111333, dated Jan. 17, 2020, 14 pages.
The First Office Action for China Application No. 201811208751.7, dated Oct. 17, 2018, 7 pages.
First Office Action for Application CN 2018112087517, State Intellectual Property Office of China, dated Feb. 25, 2020, machine translation obtained via Global Dossier on Jan. 14, 2021.†
David Linden et al., Handbook of Batteries, 3rd edition, 2002, pp. 35.1, 35.16, and 35.20, McGraw-Hill Handbooks, USA.†

* cited by examiner
† cited by third party

*Primary Examiner* — Maria Laios
*Assistant Examiner* — Angela J Martin
(74) *Attorney, Agent, or Firm* — East IP P.C.

(57) ABSTRACT

The present invention provides a negative electrode plate and a battery. The negative electrode plate comprises a negative current collector and a negative film that is provided on at least one surface of the negative current collector and comprises a negative active material. The negative film meets the follow relations: $6.0 \leq PD \times Dv50 \leq 32.0$ and $0.2 \leq PD/Dn10 \leq 12.0$. The negative electrode plate of the present invention has excellent dynamic performance, and the battery of the present invention has both excellent dynamic performance and long cycle life.

14 Claims, No Drawings

NEGATIVE ELECTRODE AND BATTERY

CROSS-REFERENCE TO RELATED APPLICATIONS

This application is a continuation of International Application No. PCT/CN2019/111333, filed on Oct. 15, 2019, which claims priority to Chinese Patent Application No. 201811208751.7, filed on Oct. 17, 2018, both of which are hereby incorporated by reference in their entireties.

TECHNICAL FIELD

The present application relates to the field of battery, especially to a negative electrode and a battery.

BACKGROUND

Rechargeable batteries are widely used in mobile phones, computers, household appliances, electric tools and other fields due to their outstanding characteristics such as light weight, high energy density, no pollution, no memory effect, and long service life. Among them, charge time is increasingly being valued by end consumers, and thus is also an important factor of limiting popularity of the rechargeable batteries.

Technically, the key technology of quick charge for batteries is to improve the speed of ion movement between positive and negative electrodes through chemical system harmonization and design optimization. If the negative electrode cannot withstand high current charge, the ions will be directly reduced and precipitated on the negative electrode surface instead of being embedded in the negative active material during rapid battery charge. At the same time, a large number of by-products will be produced on the surface of the negative electrode during rapid battery charge, which will affect the cycle life and safety performance. Therefore, the key technology to quick charge lies in the design to the negative active material and negative electrode plate.

SUMMARY

In view of the issues in the background, the purpose of the present invention is to provide a negative electrode plate and a battery, the negative electrode plate having an excellent dynamic performance, and the battery having both an excellent dynamic performance and a long cycle life.

In order to achieve the above object, in a first aspect of the present invention, the present invention provides a negative electrode plate, comprising a negative electrode current collector and a negative electrode film which is provided on at least one surface of the negative electrode current collector and comprises a negative active material; wherein the negative electrode film satisfies: $6.0 \leq PD \times Dv50 \leq 32.0$ and $0.2 \leq PD/Dn10 \leq 12.0$, in which PD represents a compacted density of the negative electrode film, in $g/cm^3$; Dv50 represents a particle size at which the negative active material reaches 50% of cumulative volume percentage, in μm; Dn10 represents a particle size at which the negative active material reaches 10% of cumulative number percentage, in μm.

In a second aspect of the present invention, the present invention provides a battery comprising the negative electrode plate according to the first aspect of the present invention.

Compared with the prior art, the present invention contains at least the following beneficial effects: a battery having an excellent dynamic performance and a long cycle life during quick charge is obtained by adjusting the relationship between the compacted density PD of the negative electrode film and the particle size Dv50 and Dn10 of the negative active material according to the present invention.

DESCRIPTION OF EMBODIMENTS

The negative electrode plate and battery according to the present invention will be described in detail below.

Firstly, the negative electrode plate according to the first aspect of the present invention is described, which comprises a negative electrode current collector and a negative electrode film which is provided on at least one surface of the negative electrode current collector and comprises a negative active material; wherein the negative electrode film satisfies: $6.0 \leq PD \times Dv50 \leq 32.0$ and $0.2 \leq PD/Dn10 \leq 12.0$, in which PD represents a compacted density of the negative electrode film, in $g/cm^3$; Dv50 represents a particle size at which the negative active material reaches 50% of cumulative volume percentage, in μm; Dn10 represents a particle size at which the negative active material reaches 10% of cumulative number percentage, in μm.

During a battery charge process, the following three electrochemical processes are required for the negative electrode plate: (1) ions (such as lithium ions, sodium ions, and the like) extracted from the positive active material enter an electrolyte and diffuse and migrate in the form of a liquid phase to the surface of the negative active material through pores of the porous negative electrode; (2) charge exchange occurs between ions and electrons on the surface of the negative active material; (3) the ions enter inside the bulk phase of the negative active material and undergo a solid phase diffusion and accumulation. In the above process, the charge exchange process is a very important step. The smaller the charge exchange resistance, the faster the electrochemical reaction is and the better the dynamic performance of the negative electrode plate is, which are beneficial to improving the rapid charge ability of batteries. Generally, factors that affect the charge exchange resistance comprise an electronic conductance and ion conductance of the entire negative electrode plate.

Generally, the higher the compacted density PD of the negative electrode film, the better the electronic contact between the active material particles in the negative electrode film is and the better the electronic conductance of the negative electrode plate is. In this situation, however, pores of the negative electrode membrane reduce, the liquid phase diffusion resistance of ions inside pores of the porous electrode negative electrode increases, and the ion conductance of the negative electrode deteriorates, thereby affecting the speed of the electrochemical reaction. The smaller the compacted density PD of the negative electrode film, the better the ion conductivity of the negative electrode is and the lower the liquid phase diffusion resistance of ions inside pores of the porous electrode negative electrode is. As a result, the ions may quickly diffuse through the pores of the porous negative electrode and migrate to the surface of the negative active material. In this situation, however, the electronic contact among particles of the active materials in the negative electrode film is worse, and the electronic conductance of the negative electrode is worse, which will also affect the speed of the electrochemical reaction. In addition, the smaller the compacted density PD of the negative electrode film, the smaller the negative electrode capacity is. As a result, the loss of energy density and cycle life of batteries will increase.

In the design of the negative electrode plate, the particle size Dv50 of the negative active material represents a particle size at which the negative active material reaches 50% of cumulative volume percentage. Generally speaking, the smaller the particle size Dv50 of the negative active material, the lower the charge exchange resistance of ions and electrons on the surface of the negative active material during rapid battery charge is, the faster the speed of the electrochemical reaction is, and the smaller the solid phase diffusion resistance of ions inside the bulk phase of the negative active material is. However, the probability that small particles (or fine powders) of the negative active material will block pores of the porous negative electrode is also higher. The liquid phase diffusion path of ions inside the pores of the porous negative electrode is extended, and the liquid phase diffusion resistance increases. The ion conduction of the negative electrode plate becomes worse, thereby affecting the speed of the electrochemical reaction. However, the particle size Dv50 of the negative active material cannot reflect the actual content of the small particles (or fine powder) of the negative active material in the negative electrode film, and therefore cannot accurately reflect the actual effect of the negative active material on the ionic conductivity of the negative electrode.

In the design of the negative electrode plate of the present invention, the compacted density PD of the negative electrode film is considered in combination with the particle size Dv50 and Dn10 of the negative active material, where Dn10 represents a particle size at which the negative active material reaches 10% of cumulative number percentage in μm, which can reflect the content of small particles (or fine powder) in the negative active material particles. Generally, the smaller the Dn10, the better the electronic conductance of the negative electrode plate is, the higher the content of small particles (or fine powder) in the negative electrode film is, and the higher the probability that pores of the porous negative electrode will be blocked is, thereby deteriorating the ion conduction of the negative electrode plate. In addition, the inventor found through a lot of research that when the compacted density PD of the negative electrode film and the particle size Dv50 and Dn10 of the negative active material are adjusted to meet the requirements of 6.0≤PD× Dv50≤32.0 and 0.2≤PD/Dn10≤12.0, the electronic conductance and ionic conductance of the entire negative electrode plate can maintain to be better, and the negative electrode plate has a smaller charge exchange resistance and a higher electrochemical reaction speed. Thus, the negative electrode plate can have excellent dynamics performance, the battery can also have the characteristics of excellent dynamic performance and long cycle life.

In some embodiments of the present invention, the lower limit of PD×Dv50 may be 6.0, 6.2, 6.4, 6.6, 6.8, 7.0, 7.2, 7.5, 7.8, 8.0, and the upper limit of PD×Dv50 may be 8.0, 9.0, 11.0, 12.0, 13.0, 14.0, 15.0, 16.0, 17.0, 18.0, 19.0, 20.0, 21.0, 22.0, 23.0, 24.0, 25.0, 26.0, 27.0, 28.0, 29.0, 30.0, 31.0, 32.0. Preferably, 7.0≤PD×Dv50≤23.0; More preferably, 7.5≤PD× Dv50≤16.0.

In some embodiments of the present invention, the lower limit of PD/Dn10 may be 0.20, 0.25, 0.30, 0.35, 0.40, 0.45, 0.50, 0.55, 0.60, 0.80, 1.0, and the upper limit of PD/Dn10 may be 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, 12.0. Preferably, 0.3≤PD/Dn10≤9.0; more preferably, 0.35≤PD/ Dn10≤6.0.

In the negative electrode plate of the first aspect of the present invention, preferably, the particle size Dv50 of the negative active material is 4 μm to 18 μm; more preferably, the particle size Dv50 of the negative active material is 4 μm to 16 μm. In the event that the particle size Dv50 of the negative active material falls within the above-mentioned preferred range, the uniformity of the negative electrode plates may be higher, which can prevent the negative active material having too small particle size from producing more side reaction with the electrolyte to affect the improvement of battery performance and which can also avoid the negative active material having too large particle size from hindering the solid phase diffusion of ions inside the bulk phase of the negative active material to affect the improvement effect on the battery performance.

In the negative electrode plate of the first aspect of the present invention, preferably, the particle size Dn10 of the negative active material is 0.1 μm to 8.0 μm; more preferably, the particle size Dn10 of the negative active material is 0.2 μm to 6.0 μm. In the event that the particle size Dn10 of the negative active material falls within the above-mentioned preferred range, the ionic conductivity of the negative electrode plate may be maintained in a better state. As a result, the negative electrode plate has more excellent dynamic performance, and the battery can also have more excellent dynamic performance and longer cycle life.

In the negative electrode plate of the first aspect of the present invention, under the same other conditions, the smaller the compacted density PD of the negative electrode film, the more developed the pore structure of the porous negative electrode is, the more favorable the liquid phase diffusion of ions inside the pores of the negative electrode porous electrode is, especially when the battery has undergone multiple charge and discharge cycle and repeated expansion and contraction. Under these conditions, the liquid phase diffusion resistance of ions inside the pores of the porous negative electrode still may be kept to a small extent. However, if the compacted density PD of the negative electrode film is too small, it will cause the negative electrode film to peel off. On charge, the electronic conductance of the negative electrode is poor so that ions are directly reduced and precipitated on the surface of the negative electrode, which affects the dynamic performance and cycle life of batteries while reducing the energy density of batteries. Preferably, the compacted density PD of the negative electrode film is from 0.9 g/cm$^3$ to 1.8 g/cm$^3$; more preferably, the compacted density PD of the negative electrode film is from 1.0 g/cm$^3$ to 1.6 g/cm$^3$. When the compacted density of the negative electrode film falls within the above-mentioned preferred range, the dynamic performance and cycle life of batteries may be better improved while maintaining the advantage of higher energy density of the batteries.

In the negative electrode plate of the first aspect of the present invention, the coating weight per unit area of the negative electrode plate also has a certain influence on the dynamic performance of the negative electrode plate. Generally, the smaller the coating weight per unit area of the negative electrode plate, the shorter the liquid phase diffusion path of ions inside pores of the porous negative electrode is, and the smaller the ion liquid phase diffusion resistance is, which are beneficial to improving the dynamic performances of the negative electrode plate and battery. In this situation, however, the negative impact on battery energy density and cycle life tends to be greater. In addition to the coating weight, a large-particle negative active material also has a certain impact on the dynamic performances of the negative electrode plate and battery. Generally, in the design of the negative electrode plate, the particle size Dv90 representing a particle size at which the negative active material reaches 90% of cumulative volume percentage indicates a large-particle negative active material, and the larger the particle size Dv90 of the negative active material, the larger the negative active material particle is, the greater the solid phase diffusion resistance of ions inside the bulk phase of the negative active material is, and the worse the ion conduction of the negative electrode plate is, which is more disadvantageous to the improvement of the dynamic performances of the negative electrode plate and battery. The inventor found through a lot of research that when the coating weight CW per unit area of the negative electrode plate and the particle size Dv90 of the negative active material are adjusted to meet $0.2 \leq CW \times Dv90 \leq 5.0$, the negative electrode plate can maintain excellent dynamic performance while having the advantages of high capacity, so that the battery may have a better improved dynamic performance while maintaining a longer cycle life and higher energy density, in which CW is a coating weight per unit area of the negative electrode plate, in $mg/mm^2$; and Dv90 is a particle size at which the negative active material reaches 90% of cumulative volume percentage, in μm.

In some embodiments of the present invention, the lower limit of CW×Dv90 may be 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, the upper limit of CW×Dv90 may be 1.8, 2.0, 2.2, 2.4, 2.6, 2.8, 3.0, 3.2, 3.4, 3.6, 3.8, 4.0, 4.2, 4.4, 4.6, 4.8, 5.0. Preferably, the negative electrode film satisfies: $1.0 \leq CW \times Dv90 \leq 4.0$; more preferably, the negative electrode film satisfies: 1.5 $CW \times Dv90 \leq 3.0$.

In the negative electrode plate of the first aspect of the present invention, preferably, the coating weight CW per unit area of the negative electrode plate is from 0.01 $mg/mm^2$ to 0.20 $mg/mm^2$. More preferably, the coating weight CW per unit area of the negative electrode plate is from 0.04 $mg/mm^2$ to 0.12 $mg/mm^2$.

In the negative electrode plate of the first aspect of the present invention, preferably, the particle size Dv90 of the negative active material is from 12 μm to 35 μm; more preferably, the particle size Dv90 of the negative active material is from 18 μm to 30 μm.

In the negative electrode plate of the first aspect of the present invention, preferably, the negative active material may be one or more selected from carbon materials, silicon-based materials, tin-based materials, and lithium titanates. Among them, the carbon material may be one or more selected from graphite, soft carbon, hard carbon, carbon fiber, and mesocarbon microspheres; the graphite may be one or more selected from artificial graphite and natural graphite; the silicon-based material may be one or more selected from elemental silicon, silicon-oxygen compounds, silicon-carbon composites, and silicon alloys; the tin-based material may be one or more selected from elemental tin, tin oxide compounds, and tin alloys. More preferably, the negative active material may be one or more selected from carbon materials and silicon-based materials.

In the negative electrode plate of the first aspect of the present invention, the negative electrode film may be disposed on either surface of the negative electrode current collector and also may be disposed on both surfaces of the negative electrode current collector. The type of the negative electrode current collector is also not specifically limited, which may be selected according to actual needs. Preferably a copper foil may be used.

It should be noted that when the negative electrode film is set on both surfaces of the negative electrode current collector, it is considered that the negative electrode plate falls within the protection scope of the present invention, as long as the negative electrode film on any one of the surfaces meets the present invention. At the same time, the parameters of each negative electrode film given in the present invention also refer to the corresponding parameters of a single-sided negative electrode film.

In the negative electrode plate of the first aspect of the present invention, the negative electrode film may further comprise a conductive agent and a binder, wherein the types of the conductive agent and the binder are not specifically limited, which may be selected according to actual requirements.

In the negative electrode plate of the first aspect of the present invention, the particle size of the negative active material, Dv50, Dv90 and Dn10 may be determined by using a laser diffraction particle size distribution measuring instrument (Mastersizer 3000). Dv50 represents a particle size at which the negative active material reaches 50% of cumulative volume percentage, Dv90 represents a particle size at which the negative active material reaches 90% of cumulative volume percentage, and Dn10 represents a particle size at which the negative active material reaches 10% of cumulative number percentage.

Next, a battery according to the second aspect of the present invention will be described, which comprises the negative electrode plate according to the first aspect of the present invention.

Furthermore, the battery of the second aspect of the present invention further comprises a positive electrode plate, a separator, an electrolyte, and the like.

It should be noted that the battery according to the second aspect of the present application may be a lithium-ion battery, a sodium-ion battery, and any other batteries using the negative electrode plate of the first aspect of the present invention.

Specifically, when the battery is a lithium-ion battery, the positive electrode plate may comprise a positive electrode current collector and a positive electrode film provided on at least one surface of the positive electrode current collector and comprising a positive active material, and the positive active material may be selected from lithium cobalt oxide, lithium nickel oxide, lithium manganese oxide, lithium nickel manganese oxide, lithium nickel cobalt manganese oxide, lithium nickel cobalt aluminum oxide, phosphorate salts with an olivine structure and the like. However, the present application is not limited to these materials, and other conventional known materials that may be used as positive active materials for lithium-ion batteries may be used. These positive active materials may be used alone or in combination of two or more. Preferably, the positive active material may be one or more selected from $LiCoO_2$, $LiNiO_2$, $LiMnO_2$, $LiMn_2O_4$, $LiNi_{1/3}Co_{1/3}Mn_{1/3}O_2$ (NCM333), $LiNi_{0.5}Co_{0.2}Mn_{0.3}O_2$ (NCM523), $LiNi_{0.6}Co_{02}Mn_{0.2}O_2$ (NCM622), $LiNi_{0.8}CO_{0.1}Mn_{0.1}O_2$ (NCM811), $LiNi_{0.85}CO_{0.15}Al_{0.05}O_2$, $LiFePO_4$ (LFP), and $LiMnPO_4$.

Specifically, when the battery is a sodium ion battery, the positive electrode plate may comprise a positive current collector and a positive electrode film provided on at least one surface of the positive electrode current collector and comprising a positive active material, the positive active material may be selected from transition metal oxides $Na_xMO_2$ (M is a transition metal, preferably one or more selected from Mn, Fe, Ni, Co, V, Cu and Cr, $O<x$ 3 1), polyanionic materials (phosphates, fluorophosphates, pyrophosphates, sulfates), Prussian blue materials, and the like. However, the present application is not limited to these materials, and other conventional known materials that may be used as positive active materials for sodium-ion batteries may be used. These positive active materials may be used alone or in combination of two or more. Preferably, the positive active material may be one or more selected from $NaFeO_2$, $NaCoO_2$, $NaCrO_2$, $NaMnO_2$, $NaNiO_2$, $NaNi_{1/2}Ti_{1/2}O_2$, $NaNi_{1/2}Mn_{1/2}O_2$, $Na_{2/3}Fe_{1/3}Mn_{2/3}O_2$, $NaNi_{1/3}Co_{1/3}Mn_{1/3}O_2$, $NaFePO_4$, $NaMnPO_4$, $NaCoPO_4$, Prussia Blue material, a material with the general formula $A_aM_b(PO_4)_cO_xY_{3-x}$ (where A is one or more selected from one or more of $H^+$, $Li^+$, $Na^+$, $K^+$, and $NH_4^+$, and M is a transition metal cation, preferably one or more selected from V, Ti, Mn, Fe, Co, Ni, Cu, and Zn, Y is a halogen anion, preferably one or more selected from F, Cl, and Br, $0<a\leq4$, $0\leq b\leq2$, $1\leq c\leq3$, $0\leq x\leq2$).

In the battery of the second aspect of the present invention, the separator is provided between the positive electrode plate and the negative electrode plate for isolation. The type of the separator is not subject to specific limitations and may be any separator material used in the prior batteries, such as polyethylene, polypropylene, polyvinylidene fluoride and their multilayer composite films, but not limited to these.

In the battery of the second aspect of the present invention, the electrolyte comprises an electrolyte salt and an organic solvent, wherein the specific types and composition of the electrolyte salt and the organic solvent are not subject to specific limitations and may be selected according to actual needs. The electrolyte may also comprise additives. The types of additives are not particularly limited, which may be negative electrode film-forming additives, positive electrode film-forming additives, or additives that can improve certain properties of batteries, such as those that improve battery overcharge performance, those that improve battery high temperature performance, those that improve battery low temperature performance, and the like.

Hereinafter, the present application will be further explained by taking a lithium-ion battery as an example in combination with specific embodiments. It should be understood that these embodiments only illustrate the application without limiting the scope of the application.

Example 1

(1) Preparation of a Positive Electrode Plate

A positive active material (see Table 1 for details), a conductive agent ethylene black, and a binder polyvinylidene fluoride (PVDF) were mixed at a weight ratio of 96:2:2, and then a solvent N-methyl pyrrolidone (NMP) was added with stirring under the action of a vacuum mixer until the system was uniform, thereby obtaining a positive electrode slurry. The positive electrode slurry was evenly applied to aluminum foil as a positive electrode current collector, and dried at room temperature, which was transferred to an oven for further drying, and then was subjected to cooling press and slitting to obtain the positive electrode plate.

(2) Preparation of a Negative Electrode Plate

A negative active material (see Table 1 for details), a conductive agent acetonitrile black, a thickener sodium methyl cellulose (CMC), and a binder styrene butadiene rubber (SBR) were mixed at a weight ratio of 96.4:1:1.2:1.2, and then a solvent deionized water was added with stirring under the action of a vacuum mixer until the system was uniform, thereby obtaining the negative electrode slurry. The negative electrode slurry was evenly applied to copper foil as a negative electrode current collector, and dried at room temperature, which was transferred to an oven for further drying, and then was subjected to cooling press and slitting to obtain the positive electrode plate.

(3) Preparation of an Electrolyte

Ethylene carbonate (EC), methyl ethyl carbonate (EMC), and diethyl carbonate (DEC) were mixed in a volume ratio of 1:1:1 to obtain a mixed organic solvent, and then anhydrous $LiPF_6$ salt was dissolved in the mixed solvent, to formulate an electrolyte with a concentration of 1 mol/L.

(4) Preparation of Separator

A polyethylene film was selected as the separator.

(5) Preparation of Lithium-Ion Battery

The above-mentioned positive electrode plate, separator, and negative electrode plate were stacked in order in which the separator was disposed between the positive and negative electrode plates for isolation, and then the stack was wound into a battery core. The battery core was placed into a packaging shell. After drying, the electrolyte was injected into the packaging shell followed by vacuum packaging, standing, forming, and shaping, thereby obtaining a lithium-ion battery.

The lithium-ion batteries of Examples 2-26 and Comparative Examples 1-9 were prepared according to the process of Example 1 with the following exception as shown in table 1.

TABLE 1

Parameters of Examples 2-26 and Comparative Examples 1-9

| | Positive Active Material | Negative Active Material | | | | Negative Electrode Film | |
|---|---|---|---|---|---|---|---|
| | | Type | Dv50 | Dv90 | Dn10 | Coating Weight (mg/mm$^2$) | Compacted CW Density PD (g/cm$^3$) |
| Ex. 1 | LFP | Graphite | 4 | 12 | 0.15 | 0.02 | 1.50 |
| Ex. 2 | LFP | Graphite | 4 | 12 | 0.20 | 0.20 | 1.60 |
| Ex. 3 | LFP | Graphite | 4 | 12 | 0.50 | 0.02 | 1.70 |
| Ex. 4 | LFP | Graphite | 5 | 15 | 1.00 | 0.08 | 1.50 |
| Ex. 5 | LFP | Graphite | 8 | 17 | 0.50 | 0.04 | 1.20 |
| Ex. 6 | LFP | Graphite | 8 | 17 | 1.00 | 0.04 | 1.40 |
| Ex. 7 | LFP | Graphite | 8 | 17 | 2.00 | 0.04 | 1.60 |
| Ex. 8 | LFP | Graphite | 12 | 29 | 1.00 | 0.08 | 1.33 |
| Ex. 9 | LFP | Graphite | 12 | 22 | 2.00 | 0.08 | 1.50 |
| Ex. 10 | LFP | Graphite | 12 | 22 | 5.00 | 0.08 | 1.70 |
| Ex. 11 | LFP | Graphite | 16 | 30 | 1.00 | 0.16 | 1.10 |
| Ex. 12 | LFP | Graphite | 18 | 35 | 0.10 | 0.10 | 1.20 |

TABLE 1-continued

Parameters of Examples 2-26 and Comparative Examples 1-9

|  | Positive Active Material | Negative Active Material Type | Dv50 | Dv90 | Dn10 | Negative Electrode Film Coating Weight (mg/mm²) | Compacted CW Density PD (g/cm³) |
|---|---|---|---|---|---|---|---|
| Ex. 13 | LFP | Graphite | 18 | 35 | 6.00 | 0.10 | 1.20 |
| Ex. 14 | LFP | Graphite | 18 | 35 | 2.00 | 0.10 | 1.00 |
| Ex. 15 | LFP | Graphite | 18 | 35 | 4.00 | 0.10 | 1.30 |
| Ex. 16 | LFP | Graphite | 18 | 35 | 4.00 | 0.10 | 1.78 |
| Ex. 17 | LFP | Graphite | 5 | 15 | 1.00 | 0.01 | 1.50 |
| Ex. 18 | LFP | Graphite | 12 | 29 | 1.00 | 0.18 | 1.60 |
| Ex. 19 | LFP | Graphite | 3 | 10 | 0.20 | 0.10 | 2.00 |
| Ex. 20 | LFP | Graphite | 20 | 38 | 1.00 | 0.10 | 1.10 |
| Ex. 21 | LFP | Graphite | 6 | 12 | 0.09 | 0.10 | 1.00 |
| Ex. 22 | LFP | Graphite | 15 | 28 | 8.20 | 0.10 | 1.60 |
| Ex. 23 | LFP | Graphite | 8 | 17 | 0.50 | 0.10 | 0.80 |
| Ex. 24 | LFP | Graphite | 6 | 12 | 0.50 | 0.10 | 1.90 |
| Ex. 25 | NCM811 | Graphite and silicon monooxide in a mass ratio of 8:2 | 16 | 30 | 3.00 | 0.16 | 1.30 |
| Ex. 26 | LFP | Graphite and hard carbon in a mass ratio of 7:3 | 16 | 30 | 6.00 | 0.16 | 1.50 |
| CEx. 1 | LFP | Graphite | 4 | 12 | 0.20 | 0.04 | 1.20 |
| CEx. 2 | LFP | Graphite | 20 | 32 | 4.00 | 0.04 | 1.80 |
| CEx. 3 | LFP | Graphite | 8 | 17 | 0.10 | 0.08 | 1.60 |
| CEx. 4 | LFP | Graphite | 18 | 35 | 8.00 | 0.08 | 1.20 |
| CEx. 5 | LFP | Graphite | 4 | 12 | 0.10 | 0.12 | 1.40 |
| CEx. 6 | NCM811 | Graphite and silicon monooxide in a mass ratio of 8:2 | 4 | 12 | 0.20 | 0.12 | 1.30 |
| CEx. 7 | NCM811 | Graphite and silicon monooxide in a mass ratio of 8:2 | 8 | 17 | 0.10 | 0.16 | 1.60 |
| CEx. 8 | LFP | Graphite and hard carbon in a mass ratio of 7:3 | 22 | 35 | 4.00 | 0.16 | 1.60 |
| CEx. 9 | LFP | Graphite and hard carbon in a mass ratio of 7:3 | 12 | 22 | 8.00 | 0.20 | 1.20 |

Next, the battery performance test will be explained.

(1) Dynamic Performance Test

At 25° C., the batteries prepared in the examples and comparative examples were fully charged at xC and fully discharged at 1 C for 10 times, then the batteries were fully charged at xC, and then the negative electrode plates were disassembled and observed for lithium precipitation on the surface of the electrode plate. If no lithium was precipitated on the surface of the negative electrode, the battery was tested again at a charge rate×C with a gradient of 0.1 C until lithium was precipitated on the surface of the negative electrode. Stop the test. At this time, the charge rate×C minus 0.1 C was determined as the maximum charge rate for the battery.

(2) Cycle Performance Test

At 25° C., the batteries prepared in the examples and comparative examples were charged at a rate of 3 C, discharged at a rate of 1 C, and subjected to a full charge full discharge cycle test until the battery has a capacity less than 80% of its initial capacity. The cycle number was recorded.

The test results of each example and comparative example are shown in Table 2.

TABLE 2

Performance test results of Examples 1-26 and Comparative Examples 1-9

|  | PD × $D_v50$ | PD/ Dn10 | PD × $D_v50$ | Maximum Charge Rate | Cycle Number |
|---|---|---|---|---|---|
| Ex. 1 | 6.0 | 10.00 | 0.24 | 3.0 C | 2800 |
| Ex. 2 | 6.4 | 8.00 | 2.40 | 3.5 C | 3300 |
| Ex. 3 | 6.8 | 3.40 | 0.24 | 3.6 C | 3700 |
| Ex. 4 | 7.5 | 1.50 | 1.20 | 4.4 C | 4200 |
| Ex. 5 | 9.6 | 2.40 | 0.68 | 4.8 C | 4500 |
| Ex. 6 | 11.2 | 1.40 | 0.68 | 4.8 C | 4500 |
| Ex. 7 | 12.8 | 0.80 | 0.68 | 4.9 C | 4900 |
| Ex. 8 | 16.0 | 1.33 | 2.32 | 5.0 C | 5500 |
| Ex. 9 | 18.0 | 0.75 | 1.76 | 3.8 C | 3500 |
| Ex. 10 | 20.4 | 0.34 | 1.76 | 3.2 C | 3000 |
| Ex. 11 | 17.6 | 1.10 | 4.80 | 3.6 C | 3500 |
| Ex. 12 | 21.6 | 12.00 | 3.50 | 3.2 C | 3100 |
| Ex. 13 | 21.6 | 0.20 | 3.50 | 3.3 C | 3200 |
| Ex. 14 | 18.0 | 0.50 | 3.50 | 3.7 C | 3300 |
| Ex. 15 | 23.4 | 0.33 | 3.50 | 3.1C | 2800 |
| Ex. 16 | 32.0 | 0.45 | 3.50 | 3.0 C | 2600 |
| Ex. 17 | 7.5 | 1.50 | 0.15 | 3.5 C | 3100 |
| Ex. 18 | 19.2 | 1.60 | 5.22 | 3.3 C | 2900 |
| Ex. 19 | 6.0 | 10.00 | 1.00 | 3.0 C | 2700 |
| Ex. 20 | 22.0 | 1.10 | 3.80 | 4.0 C | 3300 |
| Ex. 21 | 6.0 | 11.11 | 1.20 | 3.0 C | 2500 |
| Ex. 22 | 24.0 | 0.20 | 2.80 | 3.0 C | 2400 |
| Ex. 23 | 6.4 | 1.60 | 1.70 | 3.2 C | 2900 |
| Ex. 24 | 11.4 | 3.80 | 1.20 | 4.8 C | 4000 |

TABLE 2-continued

Performance test results of Examples 1-26 and Comparative Examples 1-9

| | PD × Dv50 | PD/ Dn10 | PD × Dv50 | Maximum Charge Rate | Cycle Number |
|---|---|---|---|---|---|
| Ex. 25 | 20.8 | 0.43 | 4.80 | 3.6 C | 1500 |
| Ex. 26 | 24.0 | 0.25 | 4.80 | 3.0 C | 1550 |
| CEx. 1 | 4.8 | 6.00 | 0.48 | 1.2 C | 330 |
| CEx. 2 | 36.0 | 0.45 | 1.28 | 1.1C | 320 |
| CEx. 3 | 12.8 | 16.00 | 1.36 | 1.2 C | 280 |
| CEx. 4 | 21.6 | 0.15 | 2.80 | 1.2 C | 260 |
| CEx. 5 | 5.6 | 14.00 | 1.44 | 1.0 C | 160 |
| CEx. 6 | 5.2 | 6.50 | 1.44 | 1.2 C | 330 |
| CEx. 7 | 12.8 | 16.00 | 2.72 | 1.1C | 320 |
| CEx. 8 | 35.2 | 0.40 | 5.60 | 1.2 C | 220 |
| CEx. 9 | 14.4 | 0.15 | 4.40 | 1.2 C | 160 |

It may be seen from the test results of Table 2 that the negative electrode plates in the batteries of Examples 1-26 all satisfied $6.0 \leq PD \times Dv50 \leq 32.0$ and $0.2 \leq PD/Dn10 \leq 12.0$, the compacted density PD of the negative electrode film matched with the particle size Dv50 and Dn10 of the negative active material well and the charge exchange resistance of the negative electrode plate was controlled within a small range, so that the negative electrode plate had good electronic conductivity and ion conductivity at the same time, and thus the battery had both excellent dynamic performance and long cycle life.

Comparing Examples 1-26 with Comparative Examples 1-9 shows that when at least one of PD×Dv50 and PD/Dn10 was not within the given range, the dynamic performance and cycle life of the battery both were poor.

The particle size $D_v50$ of the negative active material was preferably controlled between 4 μm and 18 μm, the particle size Dn10 of the negative active material was preferably controlled between 0.1 μm and 8.0 μm, and the compacted density of the negative electrode film was PD is preferably controlled between 0.9 g/cm$^3$ and 1.8 g/cm$^3$. When the above parameters were within the above-mentioned preferred ranges, the dynamic performance of the battery was better improved while ensuring the advantage of high energy density of the battery. At the same time, the negative electrode plate was capable of retaining the electrolyte better, the interface charge transfer impedance between the negative active material and the electrolyte was also lower, and the cycle performance of battery was also further improved. However, when one or more of the particle size Dv50 of the negative active material, the particle size Dn10 of the negative active material, and the compacted density PD of the negative electrode film failed to meet the above-mentioned preferred range, the battery might still have both excellent dynamic performance and long cycle life as long as the negative electrode plate satisfied $6.0 \leq PD \times Dv50 \leq 32.0$ and $0.2 \leq PD/Dn10 \leq 12.0$, as demonstrated by Examples 19-24.

Furthermore, when the coating weight CW per unit area of the negative electrode plate and the particle size Dv90 of the negative active material were adjusted to satisfy $0.2 \leq CW \times Dv90 \leq 5.0$, the negative electrode plate had the advantage of high capacity while maintaining excellent dynamic performance and thus the battery had a longer cycle life and higher energy density while better improving the dynamic performance.

As demonstrated by Example 17, the coating weight CW per unit area of the negative electrode plate and the particle size Dv90 of the negative active material did not match optimally, CW×Dv90<0.2. In this situation, the coating weight per unit area of the negative electrode plate was relatively small. Although the liquid phase diffusion path of ions inside pores of the porous negative electrode was shorter, and the ionic liquid phase diffusion resistance was smaller, and the dynamic performance of the battery was better, the energy density and cycle life of the battery were slightly inferior to those in Example 4.

As demonstrated by Example 18, the coating weight CW per unit area of the negative electrode plate and the particle size Dv90 of the negative active material did not match optimally, CW×Dv90>5.0. In this situation, the particle size Dv90 of the negative active material was relatively large, and the solid phase diffusion resistance of ions inside the bulk phase of the negative active material was relatively large, and the ion conduction of the negative electrode plate was slightly worse. Therefore, compared with Example 8, the improvement effect on the dynamic performance of the battery was slightly worse.

It may be seen from Examples 25-26 and Comparative Examples 6-9 that when different positive and negative active materials are used for the batteries, the batteries are capable of having excellent dynamic performance and long cycle life as long as the negative electrode plate satisfy $6.0 \leq PD \times Dv50 \leq 32.0$ and $0.2 \leq PD/Dn105 \leq 12.0$ both.

Based on the application and teaching of the foregoing specification, those skilled in the art can also make changes and modifications to the foregoing embodiments. Therefore, the present application is not limited to the specific embodiments disclosed and described above, and some modifications and changes to the present application should also fall within the protection scope of the claims of the present application. In addition, although some specific terms are used in the present specification, these terms are only for convenience of description and do not constitute any limitation to the present application.

What is claimed is:

1. A battery comprising a positive electrode plate and a negative electrode plate, the positive electrode plate comprising a positive electrode current collector and a positive electrode film which is provided on at least one surface of the positive electrode current collector and comprises a positive active material, and the negative electrode plate comprising a negative electrode current collector and a negative electrode film which is provided on at least one surface of the negative electrode current collector and comprises a negative active material, characterized in that
the positive active material is selected from lithium-containing phosphate salts with an olivine structure;
the negative active material is selected from graphite;
the negative electrode film satisfies: $6.0 \leq PD \times Dv50 \leq 32.0$ and $0.2 \leq PD/Dn10 \leq 12.0$,
the negative active material has a particle size Dn10 of 0.2 μm to 6.0 μm,
the negative electrode film has a compacted density PD of 1.0 g/cm$^3$ to 1.6 g/cm$^3$,
in which
PD represents a compacted density of the negative electrode film in g/cm$^3$;
Dv50 represents a particle size at which the negative active material reaches 50% of cumulative volume percentage in μm;
Dn10 represents a particle size at which the negative active material reaches 10% of cumulative number percentage in μm.

2. The battery according to claim 1, wherein the negative electrode film satisfies: $7.0 \leq PD \times Dv50 \leq 23.0$.

3. The battery according to claim 2, wherein the negative electrode film satisfies: $7.5 \leq PD \times Dv50 \leq 16.0$.

4. The battery according to claim 1, wherein the negative electrode film satisfies: $0.3 \leq PD/Dn10 \leq 9.0$.

5. The battery according to claim 4, wherein the negative electrode film satisfies: $0.35 \leq PD/Dn10 \leq 6.0$.

6. The battery according to claim 1, wherein the negative active material has a particle size Dv50 of 4 μm to 12 μm.

7. The battery according to claim 6, wherein the negative active material has a particle size Dv50 of 4 μm to 8 μm.

8. The battery according to claim 1, wherein the negative active material has a particle size Dn10 of 0.2 μm to 2.0 μm.

9. The battery according to claim 1, wherein the negative active material has a particle size Dn10 of 0.2 μm to 1.0 μm.

10. The battery according to claim 1, wherein the negative electrode film has a compacted density PD of 1.0 g/cm³ to 1.5 g/cm³.

11. The battery according to claim 1, wherein the negative electrode film also satisfies: $1.0 \leq CW \times Dv90 \leq 4.0$ in which
CW represents a coating weight per unit area of the negative electrode plate, in mg/mm²;
Dv90 represents a particle size at which the negative active material reaches 90% of cumulative volume percentage, in μm.

12. The battery according to claim 11, wherein the negative electrode film satisfies: $1.5 \leq CW \times Dv90 \leq 3.0$.

13. The battery according to claim 11, wherein the coating weight CW per unit area of the negative electrode plate is from 0.01 mg/mm² to 0.20 mg/mm²; and/or
the particle size Dv90 of the negative active material is from 12 μm to 35 μm.

14. The battery according to claim 13, wherein the coating weight CW per unit area of the negative electrode plate is from 0.04 mg/mm² to 0.12 mg/mm²; and/or
the particle size Dv90 of the negative active material is from 18 μm to 30 μm.

* * * * *